United States Patent
Thon

(10) Patent No.: US 10,913,113 B2
(45) Date of Patent: Feb. 9, 2021

(54) METHOD FOR PRODUCING A ROTOR OF A FLOW ENGINE

(71) Applicant: MAN DIESEL & TURBO SE, Augsburg (DE)

(72) Inventor: Ralf Thon, Velten (DE)

(73) Assignee: MAN Energy Solutions SE, Augsburg (DE)

( * ) Notice: Subject to any disclaimer, the term of this patent is extended or adjusted under 35 U.S.C. 154(b) by 544 days.

(21) Appl. No.: 15/575,153

(22) PCT Filed: May 4, 2016

(86) PCT No.: PCT/EP2016/059982
§ 371 (c)(1),
(2) Date: Nov. 17, 2017

(87) PCT Pub. No.: WO2016/184685
PCT Pub. Date: Nov. 24, 2016

(65) Prior Publication Data
US 2018/0141124 A1     May 24, 2018

(30) Foreign Application Priority Data

May 20, 2015   (DE) ........................ 10 2015 006 463

(51) Int. Cl.
*B22F 3/105*     (2006.01)
*B22F 3/24*      (2006.01)
(Continued)

(52) U.S. Cl.
CPC .............. *B22F 3/1055* (2013.01); *B22F 3/24* (2013.01); *C22C 1/0458* (2013.01); *F01D 5/02* (2013.01);
(Continued)

(58) Field of Classification Search
CPC ........ B23K 26/342; B22F 3/1055; B22F 3/24; B22F 2998/10; C22C 1/0458;
(Continued)

(56) References Cited

U.S. PATENT DOCUMENTS

| 9,266,170 | B2 | 2/2016 | Godfrey et al. |
| 2011/0052412 | A1* | 3/2011 | Ader .................... B22F 3/1055 |
| | | | 416/97 R |

(Continued)

FOREIGN PATENT DOCUMENTS

| CN | 102264493 | 11/2011 |
| CN | 102330572 | 1/2012 |

(Continued)

OTHER PUBLICATIONS

Office Action dated Oct. 3, 2019 issued in Brazilian Patent Application No. 112017022576-0.

(Continued)

*Primary Examiner* — David J Walczak
(74) *Attorney, Agent, or Firm* — Cozen O'Connor

(57) ABSTRACT

The invention relates to a method for producing a rotor of a flow engine, namely an integrally bladed rotor with an integral outer shroud, comprising at least the following steps: a rotor blank comprising the integral rotor blades and the integral outer shroud is first produced by means of a generative production method; the rotor blank is then subjected to a separating surface treatment at flow-guiding sections and is subjected, separately therefrom, to a machining surface treatment at non-flow-guiding sections.

10 Claims, 1 Drawing Sheet

(51) Int. Cl.
*C22C 1/04* (2006.01)
*F04D 29/02* (2006.01)
*F04D 29/28* (2006.01)
*F01D 5/02* (2006.01)
*F01D 5/06* (2006.01)

(52) U.S. Cl.
CPC ............ F01D 5/06 (2013.01); F04D 29/023 (2013.01); F04D 29/284 (2013.01); *B22F 2998/10* (2013.01); *F05D 2230/10* (2013.01); *F05D 2230/11* (2013.01); *F05D 2230/13* (2013.01); *F05D 2230/18* (2013.01); *F05D 2230/22* (2013.01); *F05D 2230/31* (2013.01); *F05D 2230/42* (2013.01); *F05D 2240/20* (2013.01); *Y02P 10/25* (2015.11)

(58) Field of Classification Search
CPC ........ F04D 29/023; F04D 29/284; F01D 5/02; F01D 5/06; F05D 2330/22; F05D 2230/31; F05D 2230/42; F05D 2230/18; F05D 2230/233011; F05D 2230/13; F05D 2230/10; F05D 2240/20; Y02P 10/25
USPC .................................................. 219/121.85
See application file for complete search history.

(56) References Cited

U.S. PATENT DOCUMENTS

2011/0309230 A1  12/2011  Lauwers et al.
2016/0243620 A1   8/2016  Butcher

FOREIGN PATENT DOCUMENTS

| DE | 102 61 262 A1 | 7/2004 |
| DE | 102006049216 A1 | 4/2008 |
| EP | 2 620 594 A1 | 7/2013 |
| JP | 2008 291315 A | 3/2011 |
| WO | WO 2013/029584 A1 | 3/2013 |
| WO | WO 2015/088852 A1 | 6/2015 |

OTHER PUBLICATIONS

Office Action dated Oct. 9, 2019 issued in Chinese Patent Application No. 201680029029.X.
Office Action dated Jan. 28, 2019 issued in Chinese Patent Application No. 201680029029.X.
Office Action dated Mar. 10, 2020 issued in India Patent Application No. 201747040964.

* cited by examiner

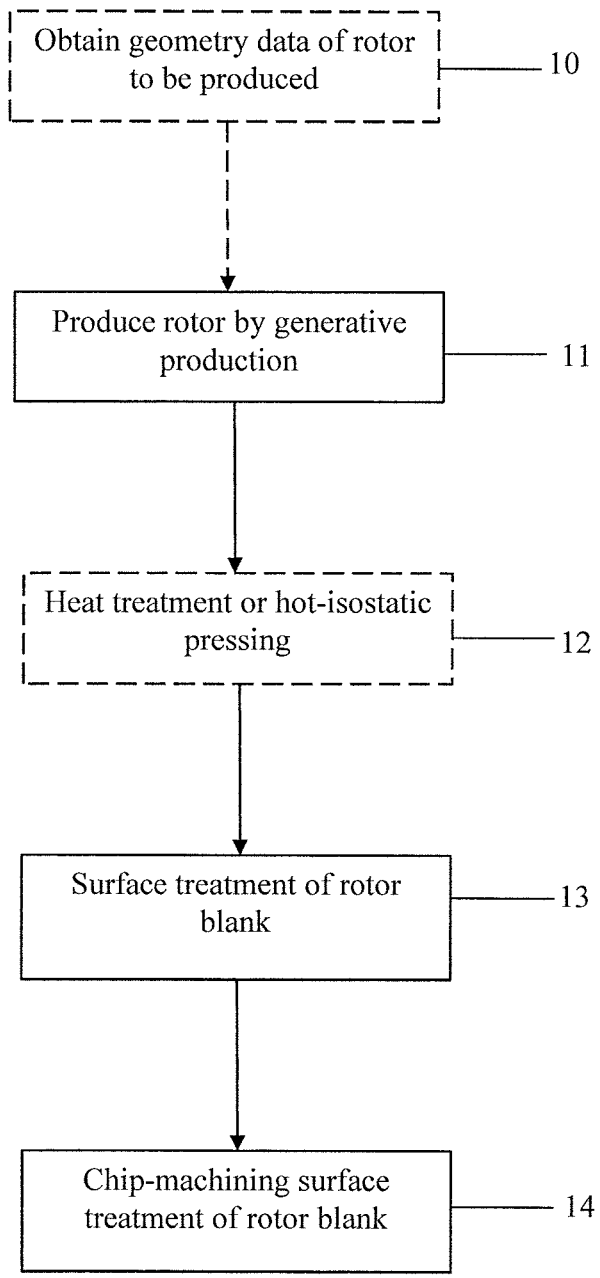

METHOD FOR PRODUCING A ROTOR OF A FLOW ENGINE

RELATED APPLICATIONS

This is a U.S. National Phase under 35 U.S.C. § 371 of International Application No. PCT/EP2016/059982, filed on May 4, 2016, and claims the priority of German Patent Application No. 10 2015 006 463.0, filed on May 20, 2015, the entire contents of which are hereby incorporated by reference.

BACKGROUND OF THE INVENTION

1. Field of the Invention

The invention relates to a method for producing a rotor of a turbo machine.

2. Description of the Related Art

A turbo machine, which can be designed as compressor or as turbine, comprises stator-side assemblies and rotor-side assemblies. The rotor-side assemblies include a rotor carrying so-called moving blades. Particularly preferably, integrally bladed rotors are employed in turbo machines, in the case of which the moving blades are an integral part of a rotor basic body. Furthermore, rotors, which comprise an outer shroud radially on the outside, are known from the prior art.

German Patent Publication No. DE 102 61 262 A1 discloses an integrally bladed rotor with an outer shroud in which the blade wheels are connected to a rotor basic body in a fixed manner by welding. For welding, either laser beam welding or electron beam welding is employed. The outer shroud can be likewise connected to the moving blades by welding radially on the outside.

Producing an integrally bladed rotor with outer shroud by welding is expensive and error-prone. Accordingly, the rotor basic body, the moving blades and the outer shroud have to be initially produced as separate assemblies and subsequently connected to one another by welding. During the welding, there is the risk that the assemblies to be welded to one another are damaged. Because of this, it may be required to replace damaged assemblies.

There is therefore a need for a new type of method for producing a rotor of a turbo machine with which welding methods can be dispensed with.

SUMMARY OF THE INVENTION

An object of the present invention is to create a new method for producing a rotor of a turbo machine. According to the present invention, a rotor blank, comprising the integral moving blades and an integral outer shroud is initially produced by way of a generative production method. Following this, the rotor blank is subjected to an abrasive cutting surface treatment on flow-conducting sections, and, separately thereof, to a chip-machining surface treatment on non-flow-conducting sections.

The present invention provides an entirely new type of process chain for producing an integrally bladed rotor with an outer shroud. Accordingly, a rotor blank, which comprises the moving blades and the outer shroud, is produced by way of a generative production method. No welded connection between the rotor basic body, the moving blades and the outer shroud is required. Following this, a surface treatment of the rotor blank produced by the generative production method takes place, namely, separately in the region of flow-conducting sections of the rotor blank and in the region of non-flow-conducting sections of the rotor blank by suitably adapted methods of the surface treatment.

According to an advantageous further embodiment, the rotor blank comprising the integral moving blades and the integral outer shroud are produced by selective laser melting, wherein the rotor blank is subjected to a flow grinding on flow-conducting sections and to a turning on non-flow-conducting sections. This step allows a particularly advantageous production of an integrally bladed rotor with an integral outer shroud.

Preferentially, a metal powder is used as a metal powder for the selective laser melting which has the following composition in percent by weight: 5.50-6.75 Al, 3.50-4.50 V, ≤0.30 Fe, ≤0.08 C, ≤0.05 N, ≤0.20 O, ≤0.015 H, and Ti in the remainder. Such a metal powder is particularly advantageously suited for the generative production of the rotor by selective laser melting.

According to a further advantageous embodiment, the rotor blank is subjected to a heat treatment and/or a hot-isostatic pressing prior to the abrasive cutting surface treatment on flow-conducting sections and prior to the chip-machining surface treatment on the non-flow-conducting sections. By way of this step, the method for producing a rotor can be further improved. By way of the heat treatment and/or the hot-isostatic pressing, the rotor blank produced by the generative production method can be specifically influenced with respect to its properties prior to the surface treatment.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is merely intended to conceptually illustrate the structures and procedures described herein.

BRIEF DESCRIPTION OF THE DRAWINGS

The FIGURE is a block diagram illustrating method steps of the method for producing a rotor of a turbo machine according to the invention.

DETAILED DESCRIPTION OF THE PRESENTLY PREFERRED EMBODIMENTS

The present invention relates to a method for producing a rotor of a turbo machine, in particular of a compressor or alternatively of a turbine.

The method produces an integrally bladed rotor with integral outer shroud, in the case of which moving blades of the rotor are thus an integral part of a radially inner rotor basic body, and wherein the rotor furthermore comprises an outer shroud radially outside which is connected to the moving blades in a fixed manner radially outside.

In the present invention, a rotor blank is initially produced by a generative production method, comprising integral moving blades and the integral outer shroud. Accordingly, the moving blades are an integral part of a rotor basic body, while the outer shroud is likewise an integral part of the rotor blank. Following this step, the rotor blank is subjected, on flow-conducting sections, to an abrasive cutting surface treatment, and, separately thereof, to a chip-machining surface treatment on non-flow-conducting sections.

The method for producing an integrally bladed rotor with integral outer shroud according to the invention manages to do without welded connections.

Further details of the method according to the invention are described in the following, making reference to the block diagram of the FIGURE, wherein in the FIGURE, shown in continuous line drawing are obligatory method steps of the method according to the invention, wherein blocks shown in dashed line drawing are not mandatory part of the method for producing an integrally bladed rotor with integral outer shroud according to the invention.

In step 10, geometry data of the rotor to be produced are provided, wherein the geometry data are design data, which are based on process conditions and based on a material selection for the rotor to be produced.

Based on the geometry data provided in step 10, the production of the rotor by a generative production method takes place in a step 11, wherein the rotor blank comprises a rotor basic body, integral moving blades and an integral outer shroud.

Preferentially, selective laser melting is used as generative production method in step 11, wherein method-related details of the selective laser melting are known.

Preferentially, a powder is used as metal powder for the selective laser melting in step 11, which in percent by weight has the following composition:

| | |
|---|---|
| 5.50-6.75 Al | Aluminium |
| 3.50-4.50 V | (Vanadium) |
| ≤0.30 Fe | (Iron) |
| ≤0.08 C | (Carbon) |
| ≤0.05 N | (Nitrogen) |
| ≤0.20 O | (Oxygen) |
| ≤0.015 H | (Hydrogen) |
| Ti | (Titanium) in the remainder |

A rotor for a turbo machine with integral moving blades and integral outer shroud can be particularly advantageously produced from such a metal powder by selective laser melting.

The rotor blank produced in step 11 by selective laser melting can be subjected in the optional method step 12 to a heat treatment and/or a hot-isostatic pressing. By way of this step, component properties of the rotor blank can be adjusted or influenced prior to the downstream method steps 13 and 14.

In the obligatory method steps 13 and 14, a surface treatment of the rotor blank on flow-conducting sections and on non-flow-conducting sections are performed separately from one another by different surface treatment methods, wherein preferentially in step 13 flow-conducting sections and subsequently in step 14 non-flow-conducting sections of the rotor blank are preferentially subjected to the surface treatment.

In the step 13, in which the flow-conducting sections of the rotor blank are subjected to a surface treatment, an abrasive cutting surface treatment is employed, preferentially a flow grinding.

Following this step, a chip-machining surface treatment of the rotor blank on non-flow-conducting sections, preferentially by turning, takes place in the method step 14.

With the method according to the invention it is possible to produce, without restrictions in terms of geometry freedom, an integrally bladed rotor with integral outer shroud. A rotor blank is produced by a generative production method, preferentially by selective laser melting, namely preferentially consisting of a metal powder of a titanium alloy. The rotor blank produced by selective laser melting is then subjected to a surface treatment, namely separately from one another via suitably adapted surface treatment methods on flow-conducting sections and on non-flow-conducting sections.

The process chain according to the invention allows the production of aerodynamically and thermodynamically optimized integrally bladed rotor with integral outer shrouds without welded connections and can be realized in lightweight construction.

Thus, while there have shown and described and pointed out fundamental novel features of the invention as applied to preferred embodiments thereof, it will be understood that various omissions and substitutions and changes in the form and details of the method described may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed embodiment of the invention may be incorporated in any other disclosed or described or suggested embodiment as a general matter of design choice. It is the intention, therefore, to be limited only as indicated by the scope of the claims appended hereto.

The invention claimed is:

1. A method for producing a rotor of a turbo machine, the rotor comprising an integrally bladed rotor with integral outer shroud, comprising the following steps:
   producing, by a generative production method, a rotor blank comprising the integral moving blades and the integral outer shroud; and
   subjecting the rotor blank, on flow-conducting sections, to an abrasive cutting surface treatment and, separately, on non-flow-conducting sections, to a chip-machining surface treatment.

2. The method according to claim 1, wherein the rotor blank comprising the integral moving blades and the integral outer shroud is produced by selective laser melting.

3. The method according to claim 2, wherein a metal powder is used as a metal powder for the selective laser melting, the metal powder having the following composition, in percent by weight:
   5.50-6.75 Al,
   3.50-4.50 V,
   ≤0.30 Fe,
   ≤0.08 C,
   ≤0.05 N,
   ≤0.20 O,
   ≤0.015 H, and
   Ti in the remainder.

4. The method according to claim 1, wherein the rotor blank is subjected to a flow grinding on flow-conducting sections.

5. The method according to claim 1, wherein the rotor blank is subjected to a turning on non-flow-conducting sections.

6. The method according to claim 5, wherein the rotor blank is subjected to a flow grinding on flow-conducting sections.

7. The method according to claim 5, wherein the flow grinding is performed prior to the turning.

8. The method according to claim 1, wherein the rotor blank is subjected to a heat treatment prior to the abrasive cutting surface treatment and prior to the chip-machining surface treatment.

9. The method according to claim 1, wherein the rotor blank is subjected to a hot-isostatic pressing prior to the abrasive cutting surface treatment and prior to the chip-machining surface treatment.

10. A method for producing a rotor of a turbo machine, the rotor comprising an integrally bladed rotor with integral outer shroud, comprising:
    producing, by a generative production method, a rotor blank comprising the integral moving blades and the integral outer shroud; and
    subjecting the rotor blank, on flow-conducting sections, to an abrasive cutting surface treatment and, separately, on non-flow-conducting sections, to a chip-machining surface treatment, and
    wherein at least one of:
        the rotor blank is subjected to a flow grinding on flow-conducting sections,
        the rotor blank is subjected to a turning on non-flow-conducting sections, and
        the rotor blank is subjected to a hot-isostatic pressing prior to the abrasive cutting surface treatment and prior to the chip-machining surface treatment.

* * * * *